United States Patent
Karimi-Cherkandi et al.

(10) Patent No.: US 10,028,196 B2
(45) Date of Patent: Jul. 17, 2018

(54) METHOD AND APPARATUS FOR SELECTING AN ACCESS POINT BASED ON DIRECTION OF MOVEMENT

(71) Applicant: Unify GmbH & Co. KG, Munich (DE)

(72) Inventors: Bizhan Karimi-Cherkandi, Boca Raton, FL (US); Farrokh Mohammadzadeh Kouchri, Boca Raton, FL (US); Schah Walli Ali, Boca Raton, FL (US)

(73) Assignee: Unify GmbH & Co. KG, Munich (DE)

( * ) Notice: Subject to any disclaimer, the term of this patent is extended or adjusted under 35 U.S.C. 154(b) by 42 days.

(21) Appl. No.: 15/264,920

(22) Filed: Sep. 14, 2016

(65) Prior Publication Data

US 2017/0006517 A1 Jan. 5, 2017

Related U.S. Application Data

(63) Continuation of application No. 14/374,063, filed as application No. PCT/US2012/051694 on Aug. 21, 2012, now abandoned.

(51) Int. Cl.
*H04W 4/00* (2018.01)
*H04W 36/32* (2009.01)
(Continued)

(52) U.S. Cl.
CPC .......... *H04W 36/32* (2013.01); *H04W 36/08* (2013.01); *H04W 48/16* (2013.01); *H04W 48/20* (2013.01);
(Continued)

(58) Field of Classification Search
None
See application file for complete search history.

(56) References Cited

U.S. PATENT DOCUMENTS

2007/0258409 A1 11/2007 Alizadeh-Shabdiz et al.
2007/0258420 A1 11/2007 Alizadeh-Shabdiz et al.
(Continued)

FOREIGN PATENT DOCUMENTS

WO 2009096769 8/2009

OTHER PUBLICATIONS

International Search Report for PCT/US2012/051694 dated May 6, 2013.
(Continued)

*Primary Examiner* — Idowu O Osifade
(74) *Attorney, Agent, or Firm* — Buchanan Ingersoll & Rooney PC

(57) ABSTRACT

A method, system and apparatus for selecting an access point includes detecting a location and direction of motion of a mobile device, detecting a strength of signal from candidate access points and determining a location of such access points based upon at least one of the (i) location and direction of motion of the mobile device, (ii) access point location information known to the mobile device, and (iii) monitoring of the change in detected signal strength from candidate access points that occurs upon the movement of the mobile device. Embodiments of the system and apparatus may include a mobile terminal device or may include such a device and a plurality of access points that provide access to a network, such as a base station or a router that provide access to an enterprise network or a local area network that is connected to the internet.

20 Claims, 4 Drawing Sheets

(51) Int. Cl.
*H04W 48/20* (2009.01)
*H04W 48/16* (2009.01)
*H04W 64/00* (2009.01)
*H04W 36/08* (2009.01)
*G01S 5/02* (2010.01)
*G01S 5/08* (2006.01)

(52) U.S. Cl.
CPC ....... *H04W 64/003* (2013.01); *H04W 64/006* (2013.01); *G01S 5/0284* (2013.01); *G01S 5/08* (2013.01)

(56) References Cited

U.S. PATENT DOCUMENTS

| | | |
|---|---|---|
| 2011/0206012 A1 | 8/2011 | Youn et al. |
| 2011/0244892 A1* | 10/2011 | MacManus ............. H04W 4/02 455/457 |
| 2013/0308470 A1 | 11/2013 | Bevan et al. |
| 2013/0331106 A1* | 12/2013 | Makh ................... H04W 36/32 455/440 |

OTHER PUBLICATIONS

Written Opinion of the International Searching Authority for PCT/US2012/051694 dated May 6, 2013.

* cited by examiner

A mobile communication terminal device determines at least one of its location and direction of motion, and speed of movement and also detects at least one of the signal strength and location of candidate access points to which it can communicate for obtaining access to a network.

The mobile communication terminal monitors received signal strength of candidate access points to determine whether the signal strength for any of the candidate access points changes during movement of the mobile communication terminal to determine at least one of (i) a rate of increase in signal strength for the candidate access points and (ii) a rate of decrease in signal strength for the candidate access points.

The mobile communication terminal determines that one of the candidate access points can provide improved connectivity to the network and select that access point for subsequent utilization for access to the network.

The mobile communication terminal communicates with at least one of (i) the selected access point and (ii) the access point to which the mobile communication terminal was previously assigned so that the mobile communication terminal is assigned to the selected access point for access to the network and is no longer assigned to the access point to which the mobile communication terminal was previously assigned.

FIGURE 4

METHOD AND APPARATUS FOR SELECTING AN ACCESS POINT BASED ON DIRECTION OF MOVEMENT

CROSS-REFERENCE TO RELATED APPLICATIONS

This application is a continuation of U.S. patent application Ser. No. 14/374,063, which is the United States national phase under 35 U.S.C. § 371 of PCT International Application No. PCT/US2012/051694, filed Aug. 21, 2012.

FIELD OF THE INVENTION

The present invention relates to communication systems, such as communication systems that utilize cellular phones, mobile computer devices, tablets, laptops, other types of terminal devices and other types of communication devices. More particularly, the present invention relates to a system, method and device configured to permit a communication terminal device to select an access point for communicating with that access point to utilize a network to which that access point is connected.

BACKGROUND OF THE INVENTION

Approaches to resolving the location of mobile devices include use of a global positioning system ("GPS") and a triangulation technique that utilizes multiple base stations such as the Global System for Mobile Communications ("GSM") triangulation method. Such approaches require the terminal device to obtain its location information by communicating with a service that identifies a location by communicating with multiple base stations or by communicating with multiple different satellites. But, some mobile devices are not part of a GSM network or are unable to utilize a GPS service. Such devices may not have a GSM receiver or GPS receiver for example and therefore may be unable to obtain or detect their location information. Terminal devices such as Session Initiation Protocol ("SIP") telephones, tablets, laptops, PC telephones, laptops or desktop computers may be configured to utilize one or more microphones and speakers for forming audio communication connections or video communication connections via an internet connection may be part of a local area network or wide area network such as an enterprise network that is connected to the internet.

Devices that are moved from beyond the range of an initial access point may need to select a new access point for ensuring the device stays connected to a particular network and is able to maintain its connection to that network. A mobile device typically makes a blind selection based on detected signal strength. For example, even if location information of the mobile device is available to that device, it may not utilize such information to select an access point. But, the reliance on the detected signal strength metric can result in picking a poor access point candidate that requires another reselection of an access point after a relatively short period of time. Further, such a selection process may only occur after a service or connection to a network has been dropped, which reduces the quality of the services available to the device via the network to which the device was connected. For example, a phone call or a video teleconference call or other type of ongoing communication session utilizing such a network connection may be dropped by a device due to movement of the device and a failure to proficiently select an appropriate access point.

We have determined that a new device, system, and method are needed for communication systems to permit mobile terminal devices to better select an access point to which it communicates for obtaining or retaining access to a network or a service hosted via that network.

SUMMARY OF THE INVENTION

We have developed a method, system and apparatus for selecting an access point. The apparatus may be a non-transitory computer readable medium or may be a mobile communication terminal, for example. The system may be a communication system or a network. The method may be a method that is implemented by an embodiment of the apparatus or system.

In one embodiment, a method for selecting an access point includes a number of steps. Those steps include a mobile communication terminal determining at least one of a location of the mobile communication terminal and a direction of motion in which the mobile communication terminal is moving. The mobile communication terminal saves the determined at least one of the location of the mobile communication terminal and the direction of motion in which the mobile communication terminal is moving. The mobile communication terminal also monitors the signal strengths of candidate access points to determine whether the signal strength for any of the candidate access points changes during movement of the mobile communication terminal such that the mobile communication terminal determines for each of the candidate access points at least one of (i) a rate of increase in signal strength for that access point and (ii) a rate of decrease in signal strength for that access point as the mobile communication terminal moves. The mobile communication terminal determines that one of the candidate access points provides improved connectivity to a network to which the mobile communication terminal is currently communicating with for access to the network based upon the monitored signal strengths of candidate access points and the saved determined at least one of the location of the mobile communication terminal and the direction of motion in which the mobile communication terminal is moving. The mobile communication terminal may select the determined one of the candidate access points for subsequent communications to register with that one of the candidate access points for accessing the network via the selected one of the candidate access points and may communicate with the selected one of the candidate access points for registering with the selected one of the candidate access points for accessing the network.

Embodiments of the method may also include additional steps. For example, the mobile communication terminal may save time information corresponding to the saved determined at least one of the location of the mobile communication terminal and the direction of motion in which the mobile communication terminal is moving. As another example, the mobile communication terminal may also determine its speed and save its determined speed.

The mobile communication terminal may stop communicating with the access point to which the mobile communication terminal was communicating with for access to the network prior to communicating with the selected one of the candidate access points for registering with the selected one of the candidate access points for accessing the network so that terminal is no longer utilizing that access point for access to the network while communicating with the selected one of the candidate access points.

In one embodiment of the method, the monitoring of the signal strength of the candidate access points includes the mobile communications terminal receiving signals from the candidate access points, detecting a signal strength for each signal, saving the signal strength of the candidate access points, and corresponding the signal strength of candidate access points with the saved location of the mobile communication terminal and the saved direction of motion in which the mobile communication terminal is moving.

It should be understood that the mobile communication terminal may be any of a number of communication terminal devices. For example, the mobile communication terminal may be a cellular phone, a mobile phone, a tablet, an internet appliance, a personal digital assistant, or a laptop computer. The access points may be any of a number of possible computer devices that provide access to a network such as base stations, routers, or wireless access points.

In some embodiments, the mobile communication terminal can also determine locations of the candidate access points. The mobile communication terminal's determination that one of the candidate access points provides improved connectivity to a network as compared to the access point to which the mobile communication terminal is currently communicating with for access to the network is also based upon the determined locations of the candidate access points.

In one embodiment, the method may include the step of the mobile communication terminal predicting a future location of the mobile communication terminal. Additionally, the mobile communication terminal determining that one of the candidate access points provides improved connectivity as compared to the access point to which the mobile communication terminal is currently in communication with for access to the network is also based upon the predicted future location of the mobile communication terminal. The improved connectivity is determined to be an improved connectivity in view of the predicted future location of the mobile communication terminal so that a momentary detection of another access point have a stronger signal does not result in a selection of that access point when the expected subsequent movement of the mobile communication terminal to the predicted location indicates that the signal of that access point will subsequently be weaker than the signal strength of at least one other candidate access point.

A communication system is also provided. In one embodiment, the communication system includes a first access point, a second access point and a mobile communication terminal. The first access point provides a first coverage area for access to a network via wireless communication with the first access point. The second access point provides a second coverage area for access to the network via wireless communication with the second access point. The mobile communication terminal is communicatively connected to the first access point for access to the network. The mobile communication terminal moves from within the first coverage area in a direction towards the second coverage area. The mobile communication terminal determines at least one of a location of the mobile communication terminal and a direction of motion in which the mobile communication terminal is moving and saves the determined at least one of the location of the mobile communication terminal and the direction of motion in which the mobile communication terminal is moving. The mobile communication terminal monitors the first signal strength of the first access point and the second signal strength of the second access point to determine whether the signal strength for the second access point changes during movement of the mobile communication terminal such that the mobile communication terminal determines that the second signal strength increases and the first single strength decreases as the mobile communication terminal moves. The mobile communication terminal may determine that the second access point provides improved connectivity to the network as compared to the first access point to which the mobile communication terminal is currently communicating with for access to the network based upon the monitored first and second signal strengths and the saved determined at least one of the location of the mobile communication terminal and the direction of motion in which the mobile communication terminal is moving. The mobile communication terminal selects the second access point for subsequent communications to register with the second access point for accessing the network via the second access point and communicates with the second access point for registering with the second access point for accessing the network when within the second coverage area.

In some embodiments of the system, the system also includes a third access point that provides a third coverage area for access to the network via wireless communication with the third access point. The mobile communication terminal may also monitor a third signal strength of the third access point to determine whether the signal strength for the third access point changed during movement of the mobile communication terminal so that the mobile communication terminal determines that the third signal strength increases and the first and second signal strengths decrease as the mobile communication terminal moves. The mobile communication terminal determines that the third access point provides improved connectivity to the network as compared to the second access point after the mobile communication terminal communicated with the second access point for registering with the second access point for accessing the network when within the second coverage area based upon the monitored first, second, and third signal strengths and the saved determined at least one of the location of the mobile communication terminal and the direction of motion in which the mobile communication terminal is moving. The mobile communication terminal may select the third access point for subsequent communications to register with the third access point for accessing the network via the third access point and may communicate with the third access point for registering with the third access point for accessing the network when the mobile terminal is within the third coverage area.

The system may also be configured so that the mobile communication terminal predicts its future location and determines that the second access point provides improved connectivity to the network as compared to the first access point to which the mobile communication terminal is currently communication with for access to the network based upon the monitored first, second and third signal strengths and the saved determined at least one of the location of the terminal and direction of motion in which the terminal is moving and is also based upon the predicted future location of the terminal. The improved connectivity may be determined to be an improved connectivity in view of the predicted future location of the terminal so that a momentary detection of the first access point or third access point having a stronger signal does not result in a selection of that access point when the subsequent movement of the terminal to the predicted location indicates that the signal of the first access point or third access point will subsequently be weaker relative to the signal strength of the second access point.

The locations of the access points may be determined by the mobile communication terminal in some embodiments of the system. The determining that the third access point provides improved connectivity as compared to the second access point after the mobile communication terminal communicated with the second access point for registering with the second access point for accessing the network when within the second coverage area based upon the monitored first, second, and third signal strengths, the locations of the first, second and third access points, and the saved determined at least one of location of the terminal and direction of motion in which the terminal is moving.

The mobile terminal may include a motion sensor in some embodiments of the system or method or mobile communication terminal. The motion sensor can detect at least one of the speed at which the mobile communication terminal is moving and the direction of motion in which the terminal is moving. The terminal may communicate with a location service to determine the location of the terminal as well. Alternatively, the terminal may communicate with one or more access points to utilize a triangulation method to assess its location. For instance, if the terminal determines the locations of the access points to which it detects signal strengths, it can estimate its location based upon the access point signal strengths and known locations of the access points. Access point location information may be obtained in a number of ways. For instance, the mobile communication terminal may communicate with an access point, an external database maintained by a server or other computer device accessible via the network, or a location service to obtain such access point location information.

A mobile communication terminal and non-transitory computer readable may also be provided. The computer readable medium may be memory such as a hard drive, a flash drive, a compact disc, or memory of an application server that hosts an application store, or other memory.

The non-transitory computer readable medium may include at least one application that is stored thereon that defines a method that is performed when the at least one application is executed by a mobile communication terminal. The method that is defined may be, for example, the different embodiments of a method discussed above that is also discussed below with reference to exemplary embodiments. For example, the method defined by the at least one application may include the mobile communication terminal determining at least one of a location of the mobile communication terminal and a direction of motion in which the mobile communication terminal is moving. The mobile communication terminal saves the determined at least one of the location of the mobile communication terminal and the direction of motion in which the mobile communication terminal is moving. The mobile communication terminal also monitors the signal strengths of candidate access points to determine whether the signal strength for any of the candidate access points changes during movement of the mobile communication terminal such that the mobile communication terminal determines for each of the candidate access points at least one of (i) a rate of increase in signal strength for that access point and (ii) a rate of decrease in signal strength for that access point as the mobile communication terminal moves. The mobile communication terminal determines that one of the candidate access points provides improved connectivity to a network to which the mobile communication terminal is currently communicating with for access to the network based upon the monitored signal strengths of candidate access points and the saved determined at least one of the location of the mobile communication terminal and the direction of motion in which the mobile communication terminal is moving. The mobile communication terminal may select the determined one of the candidate access points for subsequent communications to register with that one of the candidate access points for accessing the network via the selected one of the candidate access points and may communicate with the selected one of the candidate access points for registering with the selected one of the candidate access points for accessing the network.

The mobile communication terminal may include a transceiver unit, non-transitory memory, and a processor unit communicatively coupled to the transceiver unit and memory. The processor unit is communicatively connected to the memory such that it can execute the at least one application. The at least one application defines a method that is performed when it is executed by the processor unit. The method that is defined may include the mobile communication terminal determining at least one of a location of the mobile communication terminal and a direction of motion in which the mobile communication terminal is moving. The mobile communication terminal saves the determined at least one of the location of the mobile communication terminal and the direction of motion in which the mobile communication terminal is moving. The mobile communication terminal also monitors the signal strengths of candidate access points to determine whether the signal strength for any of the candidate access points changes during movement of the mobile communication terminal such that the mobile communication terminal determines for each of the candidate access points at least one of (i) a rate of increase in signal strength for that access point and (ii) a rate of decrease in signal strength for that access point as the mobile communication terminal moves. The mobile communication terminal determines that one of the candidate access points provides improved connectivity to a network to which the mobile communication terminal is currently communicating with for access to the network based upon the monitored signal strengths of candidate access points and the saved determined at least one of the location of the mobile communication terminal and the direction of motion in which the mobile communication terminal is moving. The mobile communication terminal may select the determined one of the candidate access points for subsequent communications to register with that one of the candidate access points for accessing the network via the selected one of the candidate access points and may communicate with the selected one of the candidate access points for registering with the selected one of the candidate access points for accessing the network.

Other details, objects, and advantages of the invention will become apparent as the following description of certain present preferred embodiments thereof and certain present preferred methods of practicing the same proceeds.

BRIEF DESCRIPTION OF THE DRAWINGS

Present preferred devices, systems, and apparatuses for providing communications between multiple communication devices are shown in the accompanying drawings and certain present preferred methods of practicing the same are also illustrated therein. It should be understood that like reference numbers used in the drawings may identify like components.

FIG. 4 is a flow chart illustrating an exemplary embodiment of a method for selecting an access point.

DETAILED DESCRIPTION OF EXEMPLARY EMBODIMENTS

Figure 1:
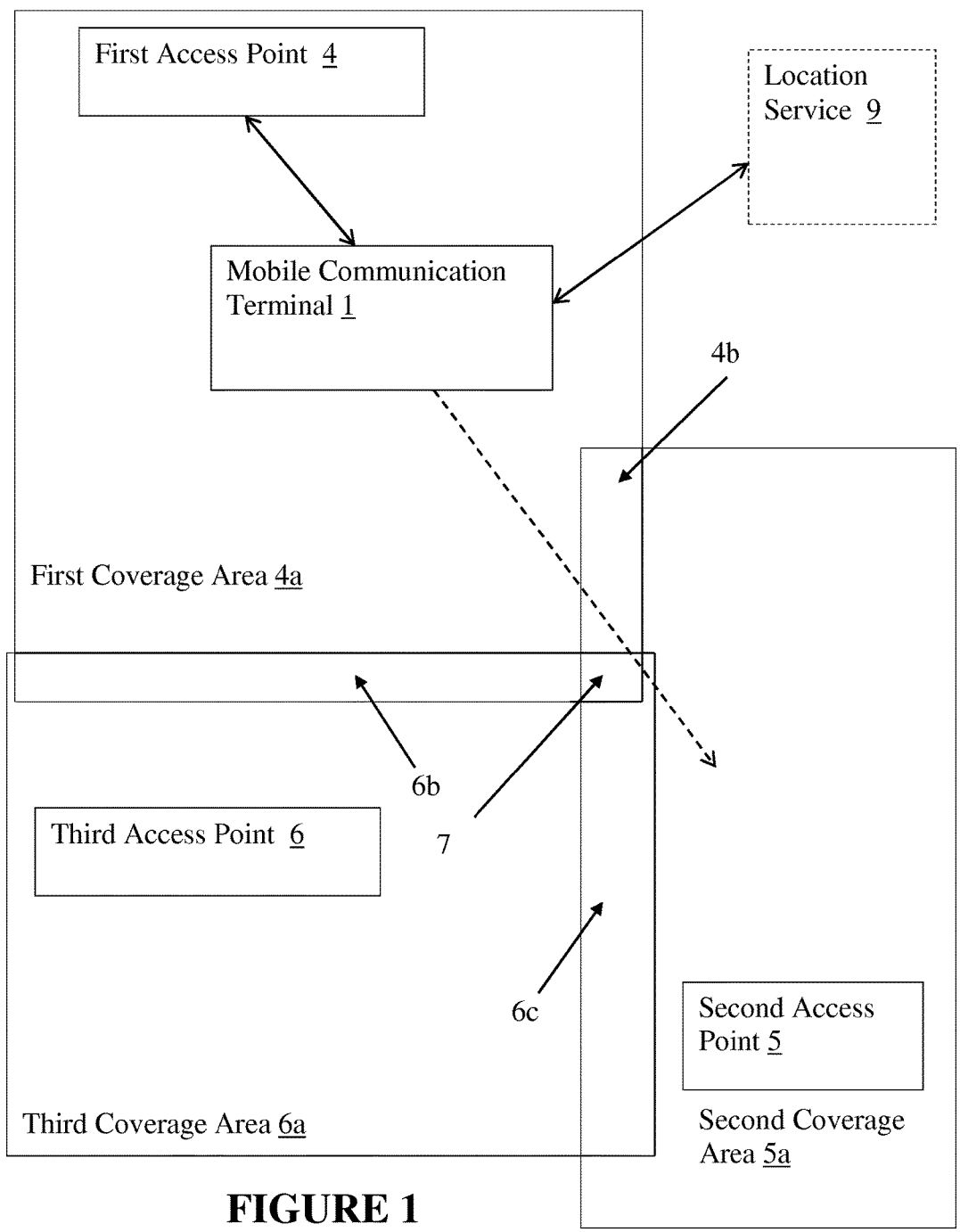
FIG. 1 is a block diagram of a first exemplary embodiment of a system. A broken line arrow in FIG. 1 illustrates a path of movement of a mobile communication terminal moving from a coverage range of a first access point to a new location within a coverage range of a second access point. An optional location service 9 is shown in broken line in FIG. 1 as well.

Referring to FIGS. 1-4, a communication system may include a network such as a wide area network or a local area network that includes one or more access points such as routers, base stations, or other types of access points that provide communication terminals with access to the network. It should be understood that a wide area network may be referred to as a "WAN" and a local area network may be referred to as a "LAN". In some embodiments, it is contemplated that an embodiment of the system may be a WAN that is at least in part configured as a wireless cellular network and each wireless access point may be a base station or cellular communication tower.

The network may include a first access point 4 that has a wireless transceiver for providing a first coverage area 4a for the first access point 4. The network may also include other access points such as a second access point 5 that includes a wireless transceiver to provide a second coverage area 5a for the second access point 5 and a third access point 6 that includes a wireless transceiver that provides a third coverage area 6a for the third access point 6.

The first, second, and third coverage areas may overlap along borders of those areas with coverage areas of other access points. For example, the third coverage area 6a for the third access point 6 may overlap with the first coverage area 4a at first overlapping coverage area 6b and may overlap with the second coverage area 5a at second overlapping coverage area 6c. The first coverage area 4a of the first access point 4 may overlap at a third overlapping coverage area 4b with the second coverage area 5a of the second access point 5. The coverage areas for the first, second and third access points may all overlap at a fourth overlapping coverage area 7 as well.

The coverage areas may be defined by the range of the radio signal strength of each access point. For instance, the first access point 4 may provide a first coverage area 4a of a one thousand meter radius around the first access point 4 the second access point 5 may provide a second coverage area 5a of a five hundred meter radius around the second access point 5 and the third access point 6 may provide a third coverage area 6a of a three hundred meter radius around the third access point 6. Of course, in other embodiments the radio signal strengths for the wireless transceivers of the access points may each provide a range differing from the exemplary ranges discussed above. The ranges may each be different values or may each be the same value. It should be understood that the access points may be positioned in different rooms of a building or may be positioned in different sites of a facility or may be otherwise positioned in different geographical locations of a predefined area of real property. It should also be understood that the shape of a coverage area could also be different than a generally circular area that has a radius.

In one embodiment, the system may be a WAN or a LAN that is configured to operate as a Wi-Fi compliant network. It should be appreciated that "Wi-Fi" is a term that is a trademark of the Wi-Fi Alliance and is a brand name associated with wireless local area networks that operate as designed by one of the Institute of Electrical and Electronics Engineers' ("IEEE") 802.11 standards.

The access points may all provide access to a WAN or LAN such as an enterprise network or a branch network of an enterprise network. The access points may of course communicate with other network nodes or network elements. For example, each of the access points may communicate with a switch device, one or more gateways, one or more servers, one or more survivability servers, one or more authentication servers, or one or more border control elements of a network to which the access points are connected. The access points may also register with one or more servers that may host a service the access points may utilize.

A mobile communication terminal 1 may be communicatively connected to the first access point 4 to obtain access to an enterprise network or other network. For example, the mobile communication terminal 1 may register with the access point for communicating with the access point for purposes of sending and receiving messages with other network nodes of the network or other terminals that may be reachable via the enterprise network for exchanging communications.

The mobile communication terminal 1 may also be communicatively connected to a location service 9 such as a GPS service or other type of location service. The mobile communication terminal 1 may communicate with the location service 9 to determine a current geographical location of the mobile communication terminal. The mobile communication terminal 1 may cyclically contact the location service 9 to obtain current geographical location information of the terminal. For instance, after a predefined period of time passes from a subsequent communication with the location service 9 for determining a current geographical location of the terminal, the mobile communication terminal 1 may communicate with the location service to obtain an updated current geographical location of the mobile communication terminal 1. In some embodiments, the access points may also communicate with the location service 9 to determine their geographical location.

The mobile communication terminal 1 may be a mobile phone such as a cellular phone or smart phone, be a laptop computer, a tablet computer device, a personal digital assistant, an internet appliance, or other type of mobile communication terminal such as a computer device configured to provide telephony or video telephony communications to a user that permits the user to participate in phone calls or conference calls. For example, in one embodiment the mobile communication terminal 1 may have a processor unit 11 that is communicatively connected to a wireless transceiver unit 13, non-transitory memory 14, a speaker 12 that emits audio, a display unit 15 such as liquid crystal display or monitor, a camera sensor 19 for capturing images or video, a microphone 18 for recording audio and a motion sensor 21 for detecting motion of the mobile communication terminal 1. The memory 14 may have at least one application 17 stored thereon. The application may have program code that is executable by the processor unit 11. The application 17 may define steps of a method that are performed by the mobile communication terminal 1 upon the execution of the program code of the application by the processor unit 11. One example of such a method defined by the application 17 may be appreciated from FIG. 4.

The wireless transceiver 13 may include a receiver unit 13a and a transmitter unit 13b. The receiver unit 13a may receive communications or data and the transmitter unit 13b may transmit data or messages to other devices. The display unit 15 may be a liquid crystal display or other type of display. The display unit 15 may be a touch screen that is configured to receive input from a user in addition to providing output to a user. The speaker 12 may include one or more speakers or one or more audio emitting devices. The microphone 18 may be an input device configured to receive audio input. Such audio input may also be stored in the memory 14. The camera sensor 19 may capture still images or video and may store such video or images in the memory 14. The microphone 18 may work in conjunction with the camera sensor 19 to record audio so that audio of a video is recorded and playable with the images of the video. The processor unit 11 may be a central processing unit such as a microprocessor, interconnected set of microprocessors or other type of processor hardware element configured to execute software stored on memory that is communicatively connected to the processor. The memory 14 may be non-transitory memory such as a flash drive, a hard drive or other memory that is communicatively coupled to the processor unit 11 so that the processor unit 11 can execute one or more applications or other software stored on the memory 14.

Of course, the mobile communication terminal may also include other input devices or output devices. For example, one or more buttons or a keyboard could be communicatively connected to the processor unit 11. As another example, a scanner, a mouse, or other input device could be communicatively connected to the processor unit. It is contemplated that a printer or other output device could also be communicatively connected to the mobile communication terminal 1.

The motion sensor 21 of the mobile communication terminal may include one or more accelerometers, a compass, a combination of at least one accelerometer and a compass, or other mechanism that is communicatively connected to the processor unit 11 for detecting at least one of a direction of motion and a speed of the mobile communication terminal 1. For example, the sensing of motion may alternatively be determined via data that is stored in memory that is received from a GPS service provider or other location service 9 to which the mobile communication terminal 1 communicates. The stored location data may be assessed to determine a speed, direction of motion, and a location of the terminal. As yet another alternative, motion sensing may be achieved by data stored in the memory that contains information obtained from two or more access points that identifies the location of those access points, the signal strengths, and the signal strength changes over time. The stored data may then be assessed by the processor unit 11 to determine movement and direction of movement.

In some embodiments, the motion sensor 21 may detect the direction of motion and the speed at which the mobile communication terminal is moving and save such data in the memory 14. A time at which such data was detected or saved can also be saved in the memory 14 and linked for corresponding to that saved speed and direction of motion data. For example, the motion sensor 21 may detect that the mobile communication terminal 1 is not moving and may subsequently detect that the mobile communication terminal is traveling southeast at a speed of five kilometers per hour.

The speed and direction information detected by the motion sensor 21 or otherwise obtained by the terminal may be stored in memory in chronological order in a table or other format so that a future location of the mobile communication terminal may be predicted or estimated. For instance, current and subsequent direction and speed information may be evaluated to determine which coverage are the mobile communication terminal 1 may be in at a future time and determine when the access point providing service within that coverage zone should be communicated with to ensure a continuous connection to the network. The steps of such a procedure may be predefined by the application 17 and may be practiced by the mobile communication terminal 1 automatically upon the processor unit 11 executing the application 17. Examples of such estimation of location and selection of access points may be appreciated from at least the below.

Figure 2:
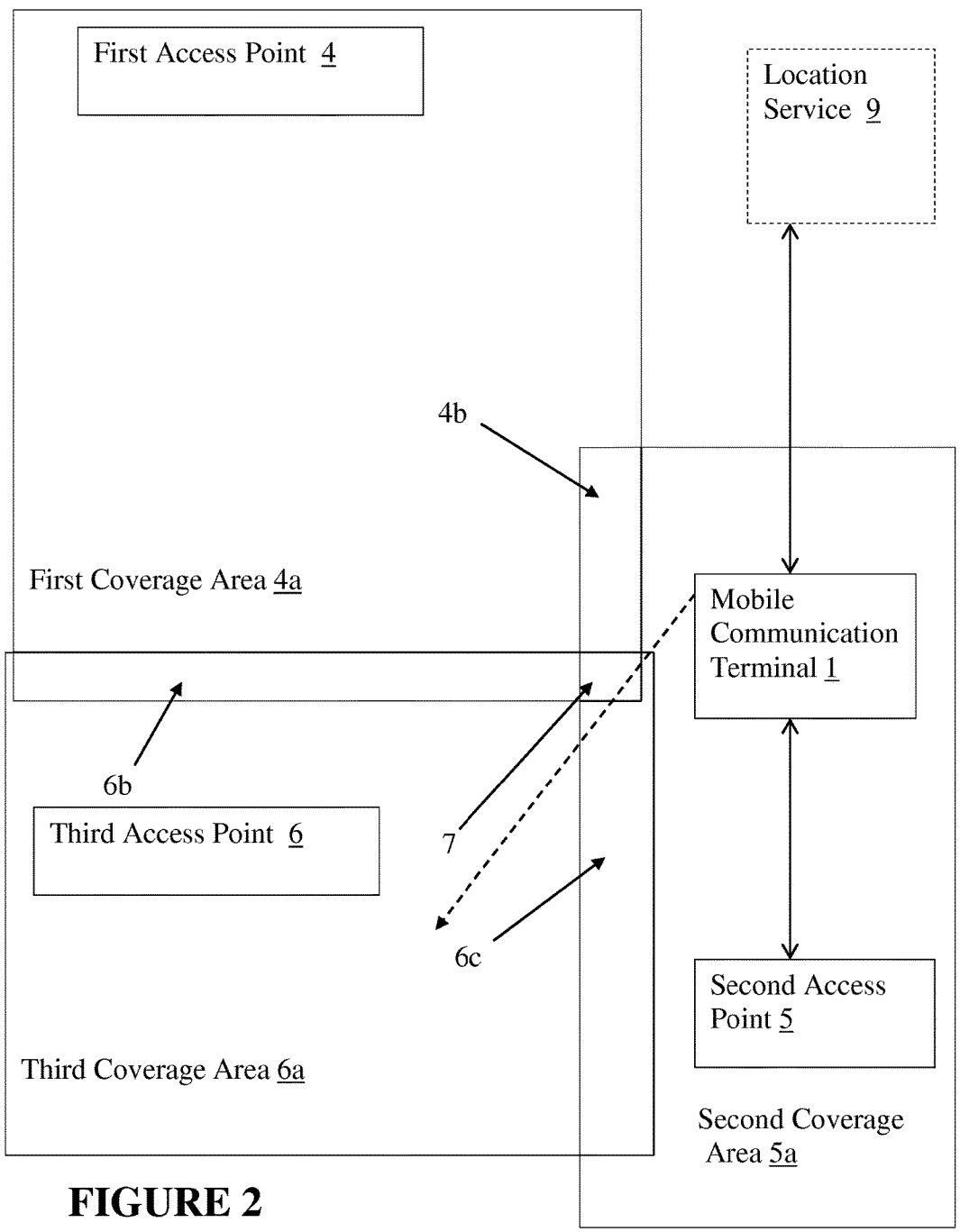
FIG. 2 is a block diagram of the first exemplary embodiment of the system illustrating a mobile device moved to within a coverage range of a second access point. A broken line arrow indicates a path of movement of the mobile communication terminal from the second coverage area to a new destination area. The optional location service 9 is shown in broken line in FIG. 2 as well.
Figure 3:
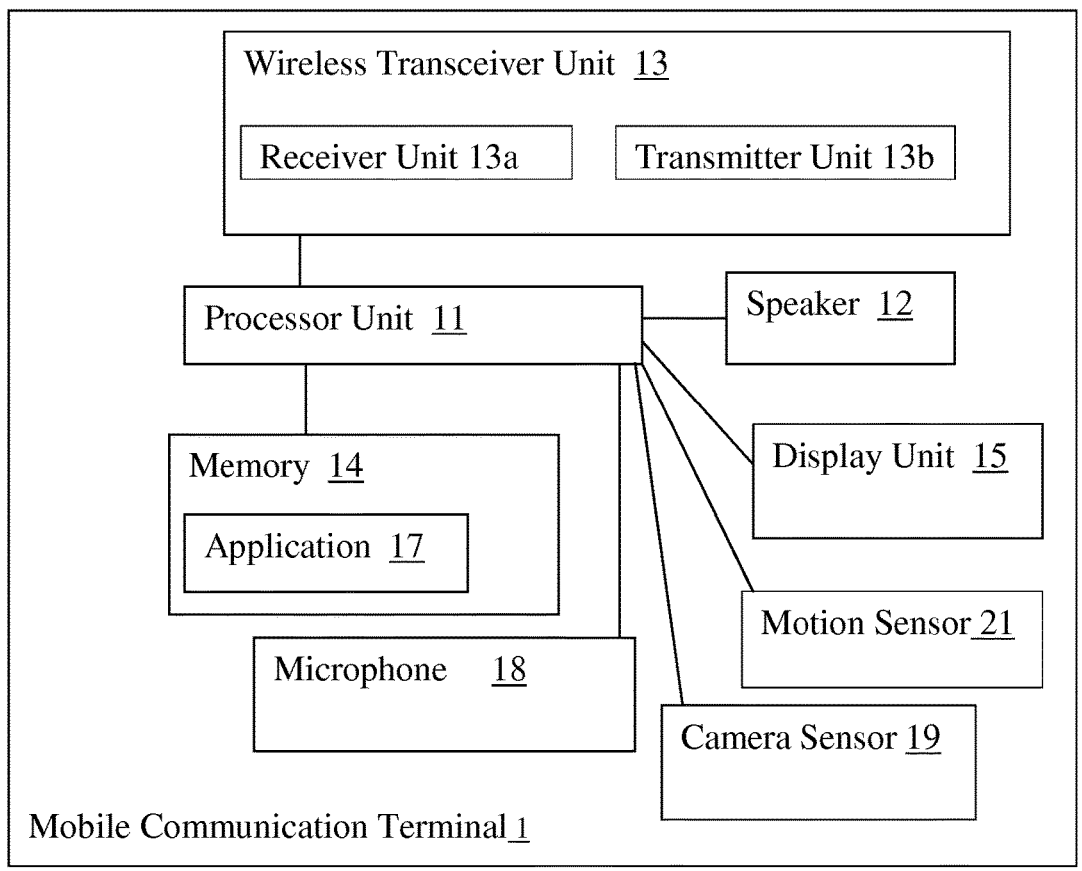
FIG. 3 is a block diagram of an exemplary embodiment of a mobile communication terminal that may be used in embodiments of the system.

For example, the mobile communication terminal 1 may detect that it is moving from a first position shown in FIG. 1 to a new position, which is shown in FIG. 2 as being located within the second coverage area 5a that is the coverage area for the second access point 5. The mobile communication terminal 1 may make such a determination based on a detection of the motion and direction of the mobile communication terminal 1 made by its motion sensor 21 or via a determination made based upon location information obtained from a location service 9. The determination may also be made based upon a prediction of where the mobile communication terminal 1 may be moved to at a particular time in view of the detected speed, location, and direction of movement of the mobile communication terminal 1 and the history of past speed, location, and direction of movement of the mobile communication terminal 1.

At the same time a predicted future location of the mobile communication terminal is being determined or after that determination is made, the mobile communication terminal may also detect a signal strength of each access point that provides a coverage area near the location of the mobile communication terminal 1. While the mobile communication terminal may be communicatively connected to the first access point 4 in the first coverage area 4a, the transceiver unit 13 may still detect the signal strength of nearby coverage areas such as the second coverage area 5a and third coverage area 6a. The signal strength may be recorded and saved in memory 14 and linked to a particular saved speed, location, and direction of motion so that a history of the location, motion and direction of motion of the mobile communication terminal can also indicate how the signal strength of different access points changes for purposes of selecting an access point to communicate with for accessing a network. The signal strength detection and strength value may be continuously monitored and saved for use in access point selection along with time data for identifying the time at which that signal strength data was detected or saved. The saved signal strength value and time data may also be linked with a saved detected speed, determined location, and direction of motion data so that such saved data corresponds with each other so that a particular speed, determined location, and direction of motion at a particular time corresponds with a detected signal strength for each access point.

The saved time, signal strength, location, speed and direction of motion data may be collected and used for predicting a path of future movement of the mobile communication terminal 1 and for selecting an access point that will provide the best coverage (e.g. highest level of signal strength for the longest period of time within a coverage area) for the mobile communication terminal for access to the network while the mobile communication terminal is in motion or is in use while in motion. Such a switch of access points to the second access point 5 could be made when the mobile communication terminal 1 enters into the third overlapping coverage area 4b, enters into the fourth overlapping coverage area 7, or when it is further within the second coverage area 5a and outside of any overlapping coverage areas depending on the signal strength of other available access points at different locations along a path of movement of the mobile communication terminal 1.

For example, the mobile communication terminal 1 may detect its ongoing motion from an initial first position in the first coverage area 4a toward a second position located in the second coverage area 5a as indicated by the broken line arrow in FIG. 1. Upon a detection of the determined future location of the mobile communication terminal 1 within the second coverage area 5a, the mobile communication terminal 1 may then seek to predict the best time to communicate with the second access point 5 for selecting the second access point 5 as the access point to communicate with for accessing the network. Such a selection may take into account a prior registration with the first access point 4 and a time delay in registering with the second access point and the changing signal strength received from the first, second, and third access points 4, 5 and 6. For example, upon entering the third overlapping coverage area 4b, the mobile communication terminal 1 may have communicated with the second access point 5 to switch to the second access point 5 as being the access point to which the mobile communication terminal communicates for accessing a network so that such a switch to the second access point 5 occurs upon entrance into the third overlapping coverage area 4b, which is within the second coverage area 5a. Alternatively, such a communication may not occur for selecting the second access point to provide access to the network until entering the fourth overlapping area 7 due to the signal strength of the first access point 4 being a stronger signal then the second access point 5 until reaching such a position.

The determination made by the mobile communication terminal 1 as to when to select the second access point 5 may be based on a number of other factors as well. For example, the mobile communication terminal 1 may be configured so that the rate of increase in signal strength of the second access point that is detected along with the recorded direction of motion must result in meeting a predefined value or threshold or exceeding such a value or threshold for a predetermined period of time before a selection of the second access point is made. Such a threshold may only come into consideration if there is more than one viable access point for selecting.

It should be understood that the path of movement of the mobile communication terminal 1 passes through fourth overlapping area 7. In this fourth overlapping area 7, the signal strength of the third access point 6 may actually be stronger than the signal strength of the second access point 5. But, the mobile communication terminal 1 may still select the second access point 5, or if already having selected the second access point 5, choose not to reselect the third access point 6 in view of this momentary detected increase in signal strength from the third access point due to the prediction that in the near future the mobile communication terminal 1 shall move further away from the third coverage area 6a of the third access point 6 and will move closer to the second coverage area 5a of the second access point 5. As a result, unnecessary switching of access points occurs. Unnecessary switching can create stress on outgoing communications and present a risk for communication interruption. By the mobile communication terminal 1 selecting a better long term access point, less switching of access points may occur which can cause less communication interruptions and less stress on the outgoing communications of the mobile communication terminal 1 and less stress on the communication capacity of the access points.

The rate of increase in signal or the rate of decrease in signal from different access points may also be assessed without reference to a threshold value. Instead, a rate of increase in signal for an access point may be monitored to confirm that motion in a particular direction corresponds to increasing signal strength while motion in that same direction may correspond to decreasing signal strength from other access points. Such a determination based on the increasing or decreasing nature of the signal strength for different candidate access points and direction of motion may be used to select an access point to replace a currently used access point as the currently used access point's signal strength decreases and continues to decrease during motion relative to other candidate access points. The mobile communication terminal 1 may determine that a selection of a new access point should be made upon the rate of increase in signal strength of one access point indicating that a candidate access point has or will soon have a substantially stronger signal and should also have a stronger signal for a longer period of time than other access points that have had a slower increase in signal strength or a decrease in signal strength during the motion of the mobile communication terminal 1.

Additionally, the actuation of the motion sensor 21 for detecting and recording the speed and direction of motion of the mobile communication terminal may only occur upon the mobile communication terminal being detected as being involved in an ongoing communication session such as a phone call or video call. If the communication terminal is in an idle state and is turned on but not in active use for engaging in a communication session (e.g. downloading data from a network node, involved in a telephone call, involved in an instant messaging session, watching a video stream, etc.), the motion sensor 21 may not be actuated for recording and saving direction of motion and speed information for use in selecting an access point. Such actuation may help preserve a battery life of the terminal so that the mechanism is only in use and utilizing terminal resources when it may provide the most benefit to a user. For embodiments of the mobile communication terminal that do not utilize a motion sensor 21 or for embodiments that have a motion sensor 21 but also utilize a location service 9, communications associated with other devices of services so the mobile communication terminal 1 can obtain its location information, direction of motion information, or speed information may also be deactivated or actuated depending upon whether the terminal is in an idle state or an active state to preserve battery life.

In some embodiments of the system, the location service 9 may also communicate geographic location information about where each of the access points is located. Such information can alternatively be communicated to the communication terminal via an access point to which that terminal is connected for access of the network as well as those access points that the mobile communication terminal detects as being available for selection for access to the network. The access point location information may be known to the mobile communication terminal, communicated via a location service or otherwise retrieved from a database that is external to the mobile communication terminal via communications with a location service, access point location service or access point that has access to such a database. Such access point location information can then also be taken into consideration for the selection of an access point based upon current and previous detected movement and direction of movement of the mobile communication terminal 1 along with the known location of different access points.

After moving to the position within the second coverage area 5a shown in FIG. 2, the mobile communication terminal 1 may stay in that position for a relatively long period of time, such as four hours or eight hours. Thereafter, the mobile communication terminal 1 may move toward a location in the third coverage area 6a as indicated by the broken line arrow illustrated in FIG. 2. The mobile communication terminal 1 may monitor the change in signal strength from the second access point 5 to which it now communicates for access to the network as well as the first access point 4 and third access point 6 that occurs from such movement along with the direction of movement of the mobile communication terminal, the location of the terminal, and speed of the terminal that is determined by the terminal for use in selecting the third access point 6 as the access point to communicate with for future continued access to the network. Such monitoring of signal strength and assessment of candidate access points may occur similar to the above described process used to switch from the first access point 4 to the second access point 5 discussed above.

The mobile communication terminal 1 could determine that it should switch to the third access point 6 when it is in motion upon it entering the third overlapping coverage area 6c, while it moves through that third overlapping coverage area 6c, when entering or passing through the fourth overlapping coverage area 7 or when the mobile communication terminal 1 passes out of that overlapping coverage area and is located further into the third coverage area 6a depending on determination of when such a switch would provide the best coverage for the mobile communication terminal for access to the network that is based on a number of the above discussed factors such as detected signal strength and the rate of changes to those detected signal strengths that results from the movement of the mobile communication terminal 1.

It should be understood that the mobile communication terminal 1 may determine to select the third access point 6 while in the fourth overlapping coverage area 7 instead of the first access point 4 even though the first access point 4 may be detected as having a stronger signal while the mobile communication terminal is within the fourth overlapping coverage area 7. But, the mobile communication terminal 1 may still select the third access point 6, or if already having selected the third access point 6, choose not to reselect the first access point 4 in view of this momentary detected increase in signal strength from the first access point due to the prediction that in the near future the mobile communication terminal 1 shall move further away from the first coverage area 4a of the first access point 4 and will move closer to the third coverage area 6a of the third access point 6. As a result, unnecessary switching of access points occurs. By selecting a better long term access point, less switching of access points may occur which can cause less communication interruptions and less stress on the outgoing communications of the mobile communication terminal 1 and less stress on the communication capacity of the access points.

It should be appreciated that variations to the exemplary systems, mobile communication terminals, non-transitory computer readable mediums, and methods discussed above may be made. For example, the memory 14 may be any of a number of different types of memory on which one or more applications may be stored so that a processor unit may execute or run those one or more applications. As another example, the mobile communication terminal may be any of a number of types of computer terminal devices such as a tablet, laptop, cellular phone, mobile phone, internet appliance, or other communication terminal. As yet another example, the number of access points or types of access points of a network may be any of a number of possible alternatives to meet a desired design objective.

As yet another example, it is contemplated that some access points that may be detected by a mobile communication terminal for obtaining access to a network may not be suitable for communications because the user of the mobile communication terminal 1 may not have a necessary authorization needed for communicating with that access point (e.g. password, authorization constraint, necessary encryption, etc.). A network may also be configured to not permit mobile communication terminals that are outside of certain constraint parameters, such as a roaming limitation, to communicate with an access point for gaining access to the network. Such access points may not be candidate access points for communications even when reachable by a mobile communication terminal when such exclusive conditions are determined to exist and the mobile communication terminal knows it cannot meet a pre-requisite condition of such an access point (e.g. previously failed to establish a connection with the access point, learning of such requirements from an external database, learning of such requirements from another communication device of the network, etc.).

While certain present preferred embodiments of a communication terminal, non-transitory computer readable medium executable by a communication terminal, a communication system, and methods of making and using the same have been shown and described above, it is to be distinctly understood that the invention is not limited thereto but may be otherwise variously embodied and practiced within the scope of the following claims.

What is claimed is:

1. A method for selecting an access point comprising:
in response to determining that a mobile communication terminal is involved in an ongoing communication session comprising transmission of at least one of voice data and video data, the mobile communication terminal actuating a process for detecting and recording speed and direction of motion of the mobile communication terminal, the process comprising:
determining a speed of the mobile communication terminal and a direction of motion in which the mobile communication terminal is moving via at least one motion sensor of the communication terminal,
the mobile communication terminal saving the determined speed of the mobile communication terminal and the direction of motion in which the mobile communication terminal is moving, and
the mobile communication terminal predicting a future location of the mobile communication terminal based on the saved direction of motion and speed of the mobile communication terminal and a determined location of the mobile communication terminal;
the mobile communication terminal monitoring signal strengths of candidate access points to determine whether the signal strength for any of the candidate access points changes during movement of the mobile communication terminal such that the mobile communication terminal determines for each of the candidate access points at least one of (i) a rate of increase in signal strength for that access point and (ii) a rate of decrease in signal strength for that access point as the mobile communication terminal moves;

during the ongoing communication session, the mobile communication terminal determining that one of the candidate access points provides improved connectivity to a network as compared to an access point to which the mobile communication terminal is currently communicating with for access to the network based upon the monitored signal strengths of candidate access points and the saved speed of the mobile communication terminal and the direction of motion in which the mobile communication terminal is moving, the location of the mobile communication terminal, and the predicted future location of the mobile communication terminal, wherein the improved connectivity is determined to be an improved connectivity in view of the predicted future location of the mobile communication terminal such that a momentary detection of another candidate access point having a stronger signal does not result in a selection of that candidate access point when expected subsequent movement of the mobile communication terminal to the predicted future location indicates that the signal of that candidate access point will be weaker than the signal strength of at least one other candidate access point;

during the ongoing communication session, the mobile communication terminal selecting the determined one of the candidate access points for subsequent communications to register with that one of the candidate access points for accessing the network via the selected one of the candidate access points;

during the ongoing communication session, the mobile communication terminal communicating with the selected one of the candidate access points for registering with the selected one of the candidate access points for accessing the network; and in response to detecting that the mobile communication terminal is not involved in an ongoing communication session comprising transmission of at least one of voice data and video data, the mobile communication terminal deactivating the process for detecting and recording speed and direction of motion of the mobile communication terminal and deactivating use of a predicted future location, speed and direction of motion information to facilitate selection of an access point for accessing the network.

2. The method of claim 1 further comprising:
the mobile communication terminal saving time information corresponding to at least one of the location of the mobile communication terminal and the direction of motion in which the mobile communication terminal is moving.

3. The method of claim 2 wherein the mobile communication terminal determines the location of the mobile communication terminal and the direction of motion in which the mobile communication terminal is moving and saves the determined location of the mobile communication terminal and the direction of motion in which the mobile communication terminal is moving.

4. The method of claim 3 further comprising:
the mobile communication terminal stopping communicating with the access point to which the mobile communication terminal was communicating with for access to the network prior to communicating with the selected one of the candidate access points for registering with the selected one of the candidate access points for accessing the network such that the mobile communication terminal no longer utilizes that access point for access to the network while communicating with the selected one of the candidate access points for access to the network.

5. The method of claim 3 wherein the mobile communication terminal determining a current location of the mobile communication terminal.

6. The method of claim 3 wherein the mobile communication terminal communicates with a location service to determine a current location of the mobile communication terminal.

7. The method of claim 3 wherein the monitoring of the signal strength of candidate access points comprises the mobile communication terminal receiving signals from the candidate access points, detecting a signal strength for each signal, saving the signal strength of the candidate access points, and corresponding the signal strength of candidate access points with the saved location of the mobile communication terminal and the saved direction of motion in which the mobile communication terminal is moving.

8. The method of claim 3 wherein the mobile communication terminal is a cellular phone, a mobile phone, a tablet, an internet appliance, a personal digital assistant, a mobile telecommunications device having a processor and non-transitory memory, or a laptop computer and wherein the candidate access points comprise at least a plurality of base stations or a plurality of routers; and wherein the method further comprising:
the mobile communication terminal determining locations of the candidate access points; and
wherein the mobile communication terminal determining that one of the candidate access points provides improved connectivity to a network as compared to an access point to which the mobile communication terminal is currently communicating with for access to the network is also based upon the determined locations of the candidate access points.

9. A non-transitory computer readable medium having at least one application stored thereon that defines a method that is performed when the at least one application is executed by a mobile communication terminal, the method defined by the at least one application comprising:
in response to determining that the mobile communication terminal is involved in an ongoing communication session comprising transmission of at least one of voice data and video data, the mobile communication terminal actuating a process for detecting and recording speed and direction of motion of the mobile communication terminal, the process comprising:
determining a speed of the mobile communication terminal and a direction of motion in which the mobile communication terminal is moving via at least one motion sensor of the communication terminal,
the mobile communication terminal saving the determined speed of the mobile communication terminal and the direction of motion in which the mobile communication terminal is moving, and
the mobile communication terminal predicting a future location of the mobile communication terminal based on the saved direction of motion and speed of the mobile communication terminal and a determined location of the mobile communication terminal;

the mobile communication terminal monitoring signal strengths of candidate access points to determine whether the signal strength for any of the candidate access points changes during movement of the mobile communication terminal such that the mobile communication terminal determines for each of the candidate access points at least one of (i) a rate of increase in signal strength for that access point and (ii) a rate of decrease in signal strength for that access point as the mobile communication terminal moves;

during the ongoing communication session, the mobile communication terminal determining that one of the candidate access points provides improved connectivity to a network as compared to an access point to which the mobile communication terminal is currently communicating with for access to the network based upon the monitored signal strengths of candidate access points and the saved speed of the mobile communication terminal and the direction of motion in which the mobile communication terminal is moving, the location of the mobile communication terminal, and the predicted future location of the mobile communication terminal, wherein the improved connectivity is determined to be an improved connectivity in view of the predicted future location of the mobile communication terminal such that a momentary detection of another candidate access point having a stronger signal does not result in a selection of that candidate access point when expected subsequent movement of the mobile communication terminal to the predicted future location indicates that the signal of that candidate access point will be weaker than the signal strength of at least one other candidate access point;

during the ongoing communication session, the mobile communication terminal selecting the determined one of the candidate access points for subsequent communications to register with that one of the candidate access points for accessing the network via the selected one of the candidate access points;

during the ongoing communication session, the mobile communication terminal communicating with the selected one of the candidate access points for registering with the selected one of the candidate access points for accessing the network; and in response to detecting that the mobile communication terminal is not involved in an ongoing communication session comprising transmission of at least one of voice data and video data, the mobile communication terminal deactivating the process for detecting and recording speed and direction of motion of the mobile communication terminal and deactivating use of a predicted future location, speed and direction of motion information to facilitate selection of an access point for accessing the network.

10. The non-transitory computer readable medium of claim 9, wherein the method further comprising:

the mobile communication terminal saving time information corresponding to at least one of the location of the mobile communication terminal and the direction of motion in which the mobile communication terminal is moving.

11. The non-transitory computer readable medium of claim 10, wherein the method further comprising:

the mobile communication terminal determining a current location of the mobile communication terminal and the direction of motion in which the mobile communication terminal is moving and saves the determined current location of the mobile communication terminal and the direction of motion in which the mobile communication terminal is moving.

12. The non-transitory computer readable medium of claim 11, wherein the method further comprising:

the mobile communication terminal stopping communicating with the access point to which the mobile communication terminal was communicating with for access to the network prior to communicating with the selected one of the candidate access points for registering with the selected one of the candidate access points for accessing the network such that the mobile communication terminal no longer utilizes that access point for access to the network while communicating with the selected one of the candidate access points for access to the network.

13. The non-transitory computer readable medium of claim 12, wherein the method further comprising:

the mobile communication terminal determining a current location of the mobile communication terminal.

14. The non-transitory computer readable medium of claim 13, wherein the mobile communication terminal communicates with a location service to determine the location of the mobile communication terminal.

15. The non-transitory computer readable medium of claim 12, wherein the monitoring of the signal strength of candidate access points comprises the mobile communication terminal receiving signals from the candidate access points, detecting a signal strength for each signal, saving the signal strength of the candidate access points, and corresponding the signal strength of candidate access points with the saved location of the mobile communication terminal and the saved direction of motion in which the mobile communication terminal is moving.

16. The non-transitory computer readable medium of claim 12, wherein the mobile communication terminal is a cellular phone, a mobile phone, a tablet, an internet appliance, a personal digital assistant, or a laptop computer and wherein the candidate access points comprise at least a plurality of base stations or a plurality of routers; and wherein the method further comprising:

the mobile communication terminal determining locations of the candidate access points; and wherein the mobile communication terminal determining that one of the candidate access points provides improved connectivity to a network as compared to an access point to which the mobile communication terminal is currently communicating with for access to the network is also based upon the determined locations of the candidate access points.

17. A communication system comprising:

a first access point configured to provide a first coverage area for access to a network via wireless communication with the first access point;

a second access point configured to provide a second coverage area for access to the network via wireless communication with the second access point; and a mobile communication terminal communicatively connectable to the first access point for access to the network; and the mobile communication terminal configured to be moveable from within the first coverage area in a direction towards the second coverage area;

the mobile communication terminal configured to determine a speed at which the mobile communication terminal is moving and at least one of a location of the mobile communication terminal and a direction of motion in which the mobile communication terminal is moving and the mobile communication terminal configured to predict a future location of the mobile communication terminal based on the determined speed and that at least one of the location and direction of motion;

the mobile communication terminal configured to save the determined at least one of the location of the mobile communication terminal and the direction of motion in which the mobile communication terminal is moving;

the mobile communication terminal configured to monitor a first signal strength of the first access point and the second signal strength of the second access point to determine whether the signal strength for the second access point changes during movement of the mobile communication terminal such that the mobile communication terminal determines that the second signal strength increases and the first signal strength decreases as the mobile communication terminal moves;

the mobile communication terminal configured to determine that the second access point provides improved connectivity to the network as compared to the first access point to which the mobile communication terminal is currently communicating with for access to the network based upon the monitored first and second signal strengths at least one of the location of the mobile communication terminal and the direction of motion in which the mobile communication terminal is moving and the predicted future location of the mobile communication terminal, wherein the improved connectivity is determined to be an improved connectivity in view of the predicted future location of the mobile communication terminal such that a momentary detection of the first access point having a stronger signal does not result in a selection of that access point when the subsequent movement of the mobile communication terminal to the predicted location indicates that the signal of the first access point or other access point will subsequently be weaker relative to the signal strength of the second access point;

the mobile communication terminal configured to select the second access point for subsequent communications to register with the second access point for accessing the network via the second access point in response to the determining that the second access point provides the improved connectivity to the network as compared to the first access point; and the mobile communication terminal configured to communicate with the second access point to register with the second access point for accessing the in response to the selection of the second access point.

18. The system of claim 17 further comprising:

a third access point configured to provide a third coverage area for access to the network via wireless communication with the third access point; and wherein the mobile communication terminal is also configured to monitor a third signal strength of the third access point to determine whether the signal strength for the third access point changes during movement of the mobile communication terminal such that the mobile communication terminal determines that the third signal strength increases and the first and second signal strengths decrease as the mobile communication terminal moves;

the mobile communication terminal configured to determine that the third access point provides improved connectivity to the network as compared to the second access point after the mobile communication terminal communicated with the second access point for registering with the second access point for accessing the network when within the second coverage area based upon the monitored first, second and third signal strengths and the speed and at least one of the location of the mobile communication terminal and the direction of motion in which the mobile communication terminal is moving;

the mobile communication terminal configured to select the third access point for subsequent communications to register with the third access point for accessing the network via the third access point in response to the determining that the third access point provides improved connectivity to the network as compared to the second access point; and the mobile communication terminal configured to communicate with the third access point to register with the third access point for accessing the network in response to the selection of the third access point.

19. The system of claim 18 wherein at least one of the first, second and third access points is a router or a base station and wherein the mobile communication terminal is a cellular phone, a mobile phone, a tablet, an internet appliance, a personal digital assistant, or a laptop computer; and wherein the mobile communication terminal is configured to determine that the second access point provides improved connectivity to the network as compared to the first access point to which the mobile communication terminal is currently communicating with for access to the network based upon the monitored first, second, and third signal strengths and the speed and least one of the location of the mobile communication terminal and the direction of motion in which the mobile communication terminal is moving is also based upon the predicted future location of the mobile communication terminal; wherein the improved connectivity is determined to be an improved connectivity in view of the predicted future location of the mobile communication terminal such that a momentary detection of the first access point or third access point having a stronger signal does not result in a selection of that access point when the subsequent movement of the mobile communication terminal to the predicted location indicates that the signal of the first access point or third access point will subsequently be weaker relative to the signal strength of the second access point.

20. The system of claim 19, wherein the mobile communication terminal is configured to monitor the first and second signal strengths such that monitoring of the first and second signal strengths comprises the mobile communication terminal receiving signals from the first and second access points, detecting a signal strength for each signal, saving the signal strengths of the first and second access points, and corresponding the signal strengths of the first and second access points with the saved location of the mobile communication terminal and the saved direction of motion in which the mobile communication terminal is moving.

* * * * *